June 29, 1965  H. LEVIN ETAL  3,191,821
DRESS FORM
Filed May 29, 1963  4 Sheets-Sheet 3
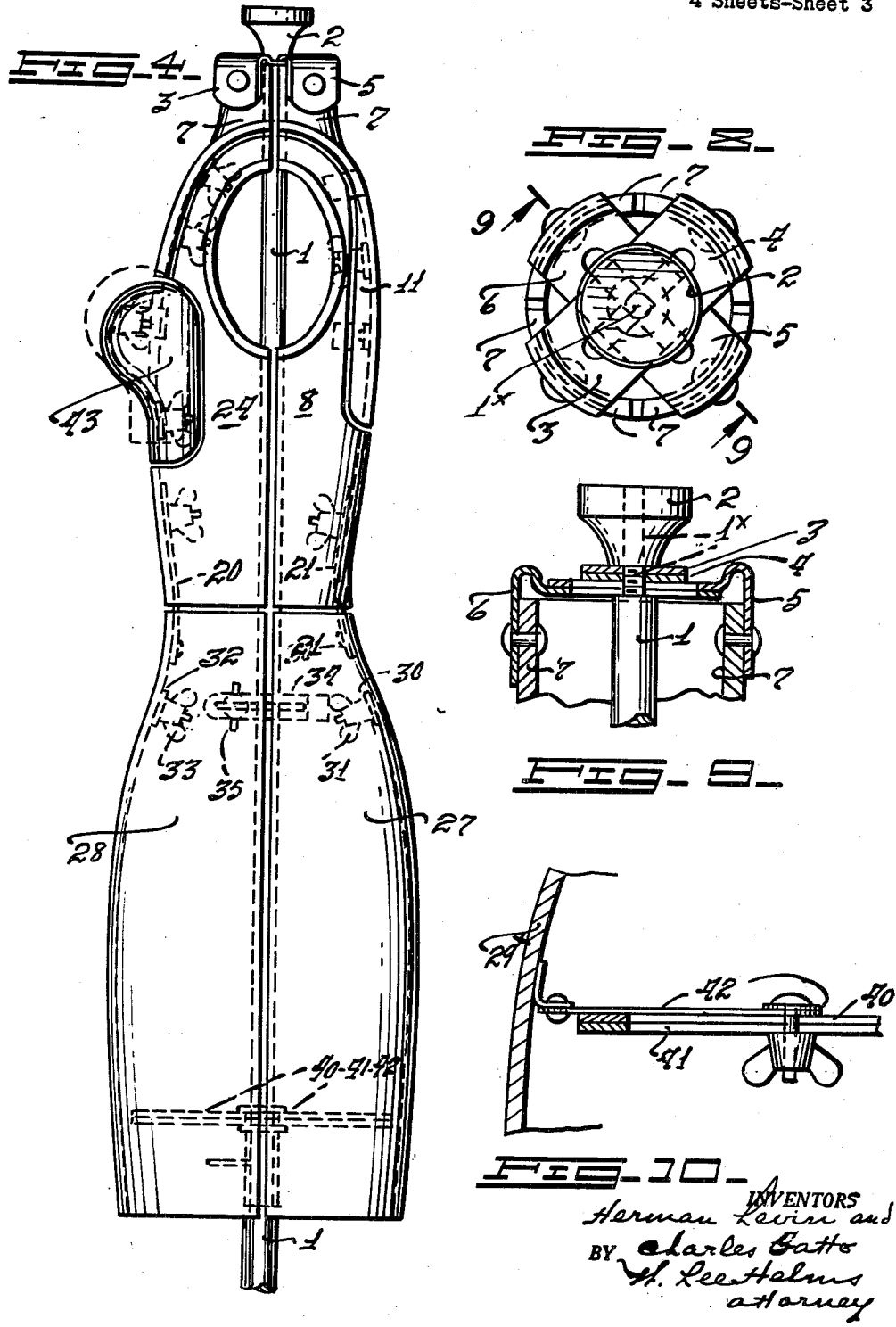
INVENTORS
Herman Levin and
BY Charles Gatto
H. Lee Helms
Attorney June 29, 1965   H. LEVIN ETAL   3,191,821
DRESS FORM
Filed May 29, 1963   4 Sheets-Sheet 4
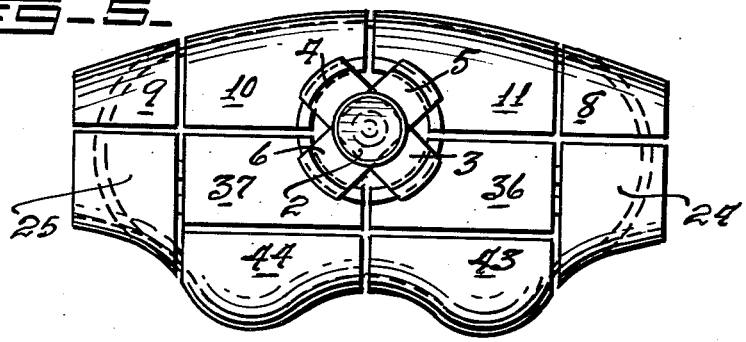
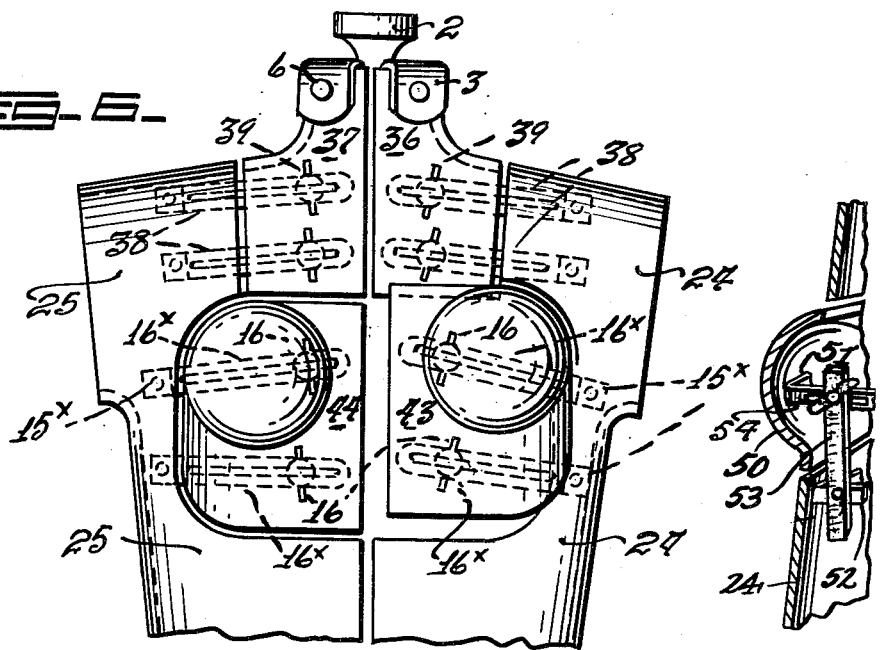
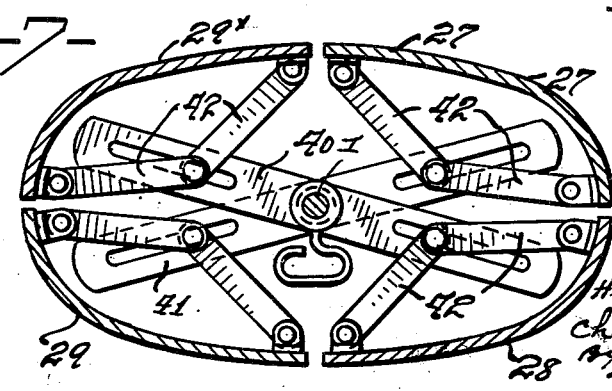
INVENTORS
Herman Levin
and
Charles Gatto
By H. Lee Helms
attorney 3,191,821
DRESS FORM
Herman Levin and Charles Gatto, Brooklyn, N.Y., assignors to Elianam Adjustable Dress Form Co., Inc., Brooklyn, N.Y., a corporation of New York
Filed May 29, 1963, Ser. No. 284,165
4 Claims. (Cl. 223—68)

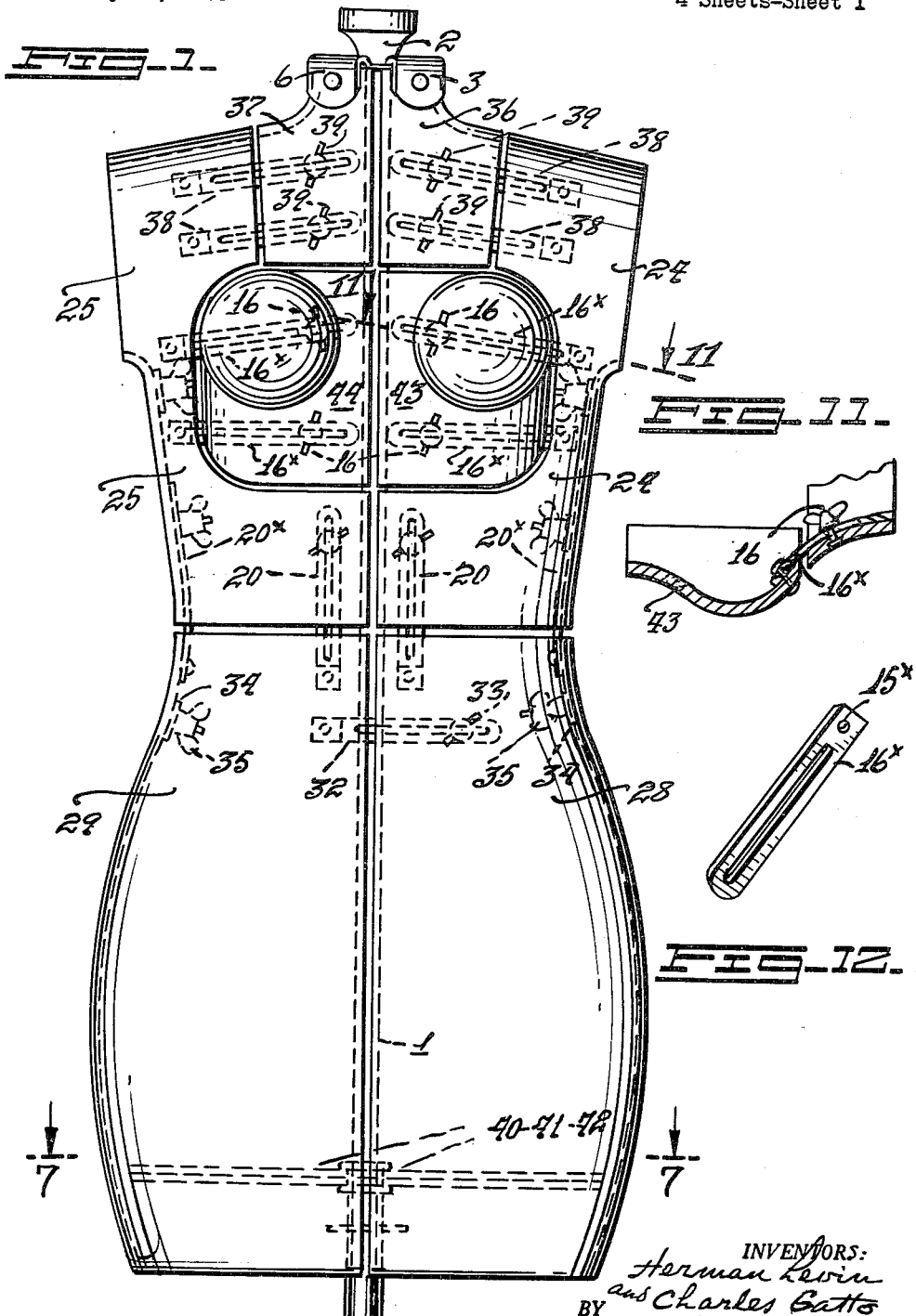

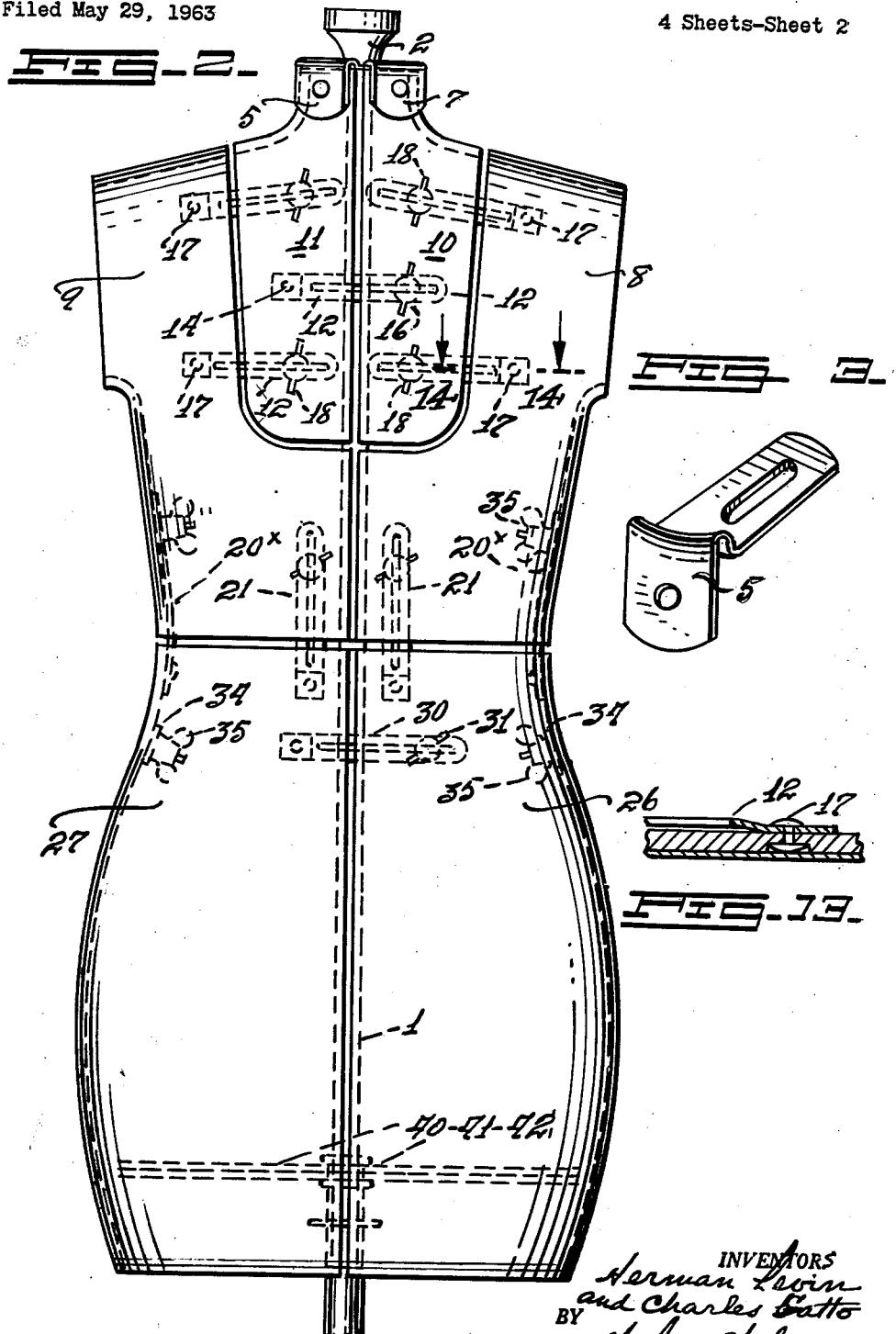

The object of the present invention is to provide a dress form having substantially universal adjustment by simple and effective means, the elements and combination being so provided that the structure may be manufactured and marketed at low cost. In the adjustment of the bust elements at the front of the dress form, the two elements may individually be adjusted inwardly or outwardly, and with a desirable adjustment upwardly and thence down, and also may be swung laterally and secured in such adjusted positions by simple and effective means.

The invention will be described wtih reference to the accompanying drawings, in which:

FIG. 1 is a view in elevation, showing an embodiment of the invention at the front thereof, certain elements being shown in dotted lines;

FIG. 2 is a view like FIG. 1, but taken at the rear of structure;

FIG. 3 is an isometric view of one of the brackets secured to the body of one dress form section;

FIG. 4 is a side elevation view, partly in dotted lines; and the elements 10, 11, 36, 37 slightly raised;

FIG. 5 is a top plan view;

FIG. 6 is a fragmentary elevation, partly broken away and partly in dotted lines, one of the two bust elements being shown in upward and outward adjusted position;

FIG. 6a is a schematic fragmentary vertical section through a modified bust area showing adjustment means.

FIG. 7 is a horizontal section on the line 7—7, FIG. 1;

FIG. 8 is a top plan view somewhat enlarged over FIG. 4, showing the uppermost adjusting elements of FIG. 4;

FIG. 9 is a vertical and fragmentary section taken on the line 9—9, FIG. 8;

FIG. 10 is an enlarged view, partly in section, showing one of the elbow and pivoted adjusting members shown in FIG. 7, the section being taken vertically, as contrasted with horizontal section of FIG. 7.

FIG. 11 is a fragmentary section, taken on the line 11—11, FIG. 1;

FIG. 12 is a perspective view of the flexible adjusting bar shown in FIG. 11;

FIG. 13 is a fragmentary longitudinal section, section through one of the vertical adjusting members, between the torso and skirt sections of the dress form, to illustrate how the fixed end of the adjusting bar is secured to an apropriate body section.

Referring to the drawings it will be seen that the body of the dress form is composed of fourteen sections. The skirt area has four sections and the torso area ten sections.

Extending through the assembly of sections is a rod 1 having a threaded end extension $1^x$, on which is threaded a thumb nut 2 overlying four adjusting plates 3 and 4, and 5 and 6, which are overlapped and each being connected to an appropriate one of the four neck members 7 of the dress form. By turning thumb nut 2, the slotted plates may be moved inwardly or outwardly, to carry the front and back sections outwardly or inwardly, to expand or contract the torso parts of the dress form. The lower area of rod 1 may be mounted on a stand (not shown).

Referring to FIG. 2, the dress form has two major back sections 8 and 9, and two minor back sections, 10 and 11. Sections 10 and 11 are connected by a slotted arm 12 riveted to one section at 14. A threaded stud is passed through the slot of arm 12 and connected to section 10. The threaded end of the stud receives a thumb nut 16 operable from within the dress form. The two minor back sections 10 and 11 are connected to the primary back sections 8 and 9 in the same manner, as shown in FIG. 13, each of the two adjusting arms for either section 11 or section 10 is riveted at 17 to the appropriate primary back member 8 or 9, and its longitudinal slot receives a threaded stud connected to the appropriate secondary back member 10 or 11, and in the case of the arrangement shown in FIG. 11, a thumb nut being threaded in position for clamping action.

At the front of the dress form, the torso and skirt sections are adjustably connected by the same longitudinally slotted adjusting bars and thumb nuts, so that description thereof is redundant. At the front of the dress form there may be two of the said elements, indicated at 20, and at the rear of the dress form there may be two of said elements indicated at 21, FIG. 2. Also, there is one element $20^x$ at each side.

The adjusting bars 20, $20^x$ and 21 permit relative vertical adjustment of the torso and skirt sections. The means for effecting adjustment horizontally in addition to those at the very top of the structure, will now be described.

The rear primary torso sections 8 and 9 have their counterpart at the front of the dress form by the primary front torso sections 24 and 25. At the rear of the dress form, primary skirt sections 26 and 27 have their counterpart at the front by primary front skirt sections 28 and 29. The skirt sections 26 and 27 are connected by adjusting bar 30, FIG. 2, with its thumb nut 31, the arrangement being the same as in FIGURES 11 and 12, with respect to the elements 15, 16 and $16^x$. At the front of the dress form, the skirt sections 28 and 29 are connected by adjusting bar 32, with its thumb nut 33. At their sides, the two skirt sections 27 and 28 are connected by like horizontal adjusting bars 34 with their thumb nuts 35. A like adjusting arrangement is provided with respect to a pair of front and neck-extending sections 36, 37, FIG. 1, connected to the adjacent sections 24 and 25, by the longitudinally slotted bars indicated at 38, with their thumb nuts at 39. A coacting pair of rear neck extending sections 10, 11, are connected, as hereinbefore described by the longitudinally slotted bar 12, with its thumb nut 16. As to all of these connecting bars, the threaded shank of the thumb nut assembly is riveted to one section and one end of the bar is riveted to the adjacent section, the said threaded shank passing through the slot of the bar.

The skirt sections at the lower area may be adjustably joined by any suitable means, that shown comprising swing bars 40, 41, pivoted on rod 1 and connected to the skirt sections by pivotably joined pairs of links 42. Each pair has a stud passing through a slot in the appropriate swing bar. The specific arrangement shown is illustrative only.

At the front of the structure below neck extending sections 36 and 37 are two bust sections 43 and 44, FIGS. 1 and 6. Each bust section is adjustably connected to its appropriate torso section 24, 25, by the special longitudinally slotted adjusting bars 16$^x$, FIG. 11, with their wing nuts 16. Preferably, the bars 16$^x$ are curved as shown in FIG. 11, but they may be straight, as shown in FIG. 12 and of sufficiently deformable metal strip to be flexed by the user into curved shape, to maintain its bust section in outward adjusted position. The adjusting bars 16$^x$ have pivotal movement on their rivet-studs 15$^x$ and hence each of the bust sections may be raised or lowered and also adjusted outwardly or inwardly, independently of the other. In FIG. 6 the right-hand bust section 43 is shown raised relatively to its companion bust section.

In operating the dress form, it will be seen that all of the torso adjusting bars can be reached through the open arm areas, FIG. 4, so that the thumb nuts may be turned to release the sections for adjustment. When the appropriate expanded or contracted area of the torso has been reached, the bust sections may be adjusted by turning the thumb nuts 16, FIG. 11, to release position, and then moving the bust members 43 and 44, or one of them, outwardly or inwardly, and by independently swinging them, as required, and then tightening the thumb nuts. It will be understood that various modifications may be made in the form and arrangement of the elements constituting the embodiment of the invention, without departing from the spirit of the invention. Each section of the dress form may be made of molded pulp, usually faced with light fabric, so that the structure is of low weight. It is preferred that when the sections are at an intermediate point of adjustment, the thumb nuts lie at about the longitudinal center of the slots, to permit ready expansion or constraction of the dress form by appropriate movements of the sections.

In FIG. 6a, I have shown a modified form for the bust sections, particularly with respect to the adjustment of each bust section, the latter at 50 being of somewhat reduced general area. Bust section 50 preferably has applied thereto, and to the appropriate side section 24 or 25, one of the slotted bar members 16$^x$ (not shown in FIG. 6), but the primary adjusting means consists of a slotted bracket 51 connected to the bust section, a bracket 52 connected to the adjacent side section (in this case section 24), and a bar 53 pivoted to bracket 52. The slot of bracket 51 receives a stud passed through the slot of bracket 51 and through an aperture in bar 53, the threaded outer end of the stud receiving a thumb nut 54. Of course the stud will be headed back of the slot of bracket 51. This arrangement provides substantially universal adjustment.

An important characteristic of the invention is as follows:

Because upward movement of handle 2 will carry with it the neck sections and the secondary front and back sections, upon release of the thumb nuts 18 and 39, the said front and back sections 10, 11, 36, 37 may be raised above the side sections 8, 9, 24, 25, as shown in FIG. 4. This enables rocking of the upper areas of the last named sections inwardly of the sections 10, 11, 36, 37, the waist area remaining substantially unchanged. This enables reduction in width of the torso from shoulder end to shoulder end thereof, without changing the waist area.

By pulling outward the torso sections at the arms, the the raised sections as a unit will automatically drop in place to their original position. By grasping the torso sections at the arm holds and pulling them outward, increases in the width of the shoulders may be secured. The base of the adjacent sections either in front or at back, may be adjusted outwardly to correspond to the increased width of the areas of the torso above the adjusted sections.

With relation to the bust, by means of the adjusting bars, the two bust sections may be moved directly outward to increase projection, or a reverse action will decrease their projection, or they may be moved downwardly or upwardly from initial position, to correspond with a desired higher or lower bust. Also, the bust sections may be moved away from each other for such moderate adjustment required in accordance with the torso of the user.

It will be understood that the slotted bars are preferably made of bendable metal, so that their initial straight form may be bent into the curvature of the dress form torso whenever that is desired, for adjustment purposes.

Having described my invention, what I claim and desire to secure by Letters Patent is as follows:

1. A dress form having a skirt composed of a plurality of interconnected front and back sections, a torso comprising two side-by-side neck members at the front of the dress form and two side-by-side neck members at the back of the dress form, two primary front sections and two primary back sections, each of said primary front and back sections being generally L-shaped and extending from a shoulder top line of the dress form to the waistline thereof, the outer margins of each primary front section tapering inwardly, said primary front sections and said front neck members encompassing a transversely elongated space, two bust sections in said space, means adjustably holding said bust sections to the primary front sections, means connecting the neck members to the primary front sections and consisting, for each neck member, of a slotted bar carried by the appropriate primary front section and a threaded stud connected to the appropriate neck member and passed through the slot of said bar, said stud receiving a thumb nut, and means connecting said neck members at their tops and permitting simultaneous bodily movement thereof, independently of the bust sections, upon release of said thumb nuts.

2. A dress form constructed in accordance with claim 1 in which the neck members at the front and the back of the dress form are inter-connected, the interconnecting means consisting of four slotted bars in overlapping relationship, each bar being connected to one neck member, a rod underlying said bars and having a threaded projection passed through the slots of said bars, a thumb nut on said threaded projection, means releasably supporting said rod, the assembled neck members being wedge shaped, and the inner margins of the primary front sections being outwardly inclined accordingly, and releasable connections between the neck members and the primary front and back sections permitting bodily movement of the neck members upwardly and thence inward movement of the primary front and back sections.

3. A dress form constructed in accordance with claim 1, in which the means adjustably holding the bust sections to the primary front sections consist of two slotted bars, one for each bust section, each bar having pivotal connection at one end to a primary front section and a threaded stud passed through the slot of said bar and connected to the bust section, and a thumb nut on said stud, each slotted bar being adapted to enable outward and swinging movement of the bust section to which it is so connected, and also movement of said bust section in overlapping position relatively to said primary front section.

4. A dress form constructed in accordance with claim 1, in which the means adjustably holding the bust sections to the primary front sections consist of two slotted bars, one for each bust section, each bar having pivotal connection at one end to the adjacent primary front section to which it is connected, a threaded stud connected to a bust section and passed through the slotted bar, and a thumb nut on said stud, each slotted bar being adapted to enable outward and swinging movement of the bust section to which it is connected, and also movement of said bust section in overlapping position relatively to the primary front section to which said bar is connected, said slotted bar being outwardly curved from its connection with said primary front section to its connection with said bust section.

References Cited by the Examiner

UNITED STATES PATENTS

| | | | | |
|---|---|---|---|---|
| 921,184 | 5/09 | Ufford | | 223—68 |
| 1,313,303 | 8/19 | Konikoff | | 223—68 |
| 1,351,180 | 8/20 | Luery et al. | | 223—68 |

FOREIGN PATENTS

| | | |
|---|---|---|
| 1,027,757 | 5/53 | France. |
| 7,618 | 3/12 | Great Britain. |

JORDAN FRANKLIN, *Primary Examiner.*